United States Patent [19]

Thomas

[11] 4,256,328
[45] Mar. 17, 1981

[54] AUTOMATIC ARTICULATION DEVICE FOR PASSIVE SEAT BELT SYSTEMS

[75] Inventor: Rudy V. Thomas, Sterling Heights, Mich.

[73] Assignee: Allied Chemical Corporation, Morris Township, N.J.

[21] Appl. No.: 62,277

[22] Filed: Jul. 30, 1979

[51] Int. Cl.³ .............................................. B60R 21/10
[52] U.S. Cl. ................................................... 280/802
[58] Field of Search ............... 280/802, 803, 804, 808; 297/469

[56] References Cited

U.S. PATENT DOCUMENTS 3,850,446  11/1974  Hogensen ............................. 280/802
4,084,841  4/1978  Hayashi ................................ 280/802
4,190,266  2/1980  Cachia .................................. 280/802

FOREIGN PATENT DOCUMENTS 2539830  10/1977  Fed. Rep. of Germany ........... 280/802
1388382  3/1975  United Kingdom ..................... 280/803
1407612  9/1975  United Kingdom ..................... 280/804

Primary Examiner—John A. Pekar
Attorney, Agent, or Firm—Roger H. Criss

[57] ABSTRACT

A vehicle passive seat belt system including a seat belt movable into and out of a restraining position by a pivotable lever located inboard of a seat in the vehicle, and a protective arm rest for the lever which is pivotable in a direction opposite to the pivotable movement of the lever.

16 Claims, 3 Drawing Figures

AUTOMATIC ARTICULATION DEVICE FOR PASSIVE SEAT BELT SYSTEMS

BACKGROUND OF THE INVENTION

1. Field of the Invention

This invention relates to a passive seat belt system including a pivotable mechanism for moving the seat belt to its occupant restraining and non-occupant restraining positions.

2. Description of the Prior Art

Various means have been previously suggested to move a shoulder belt or shoulder and lap belt passive seat belt systems into and out of occupant restraining positions. Pivotable mechanisms have been suggested in copending patent application Ser. No. 839,158, filed Sept. 28, 1977 of J. Cachia (wherein a lever is pivotably mounted along the roof line of the vehicle), U.S. Pat. No. 3,850,446 to Hogensen (wherein a lever is pivoted on the door) and U.S. Pat. No. 4,084,841 to Hayashi et al. (wherein a lever is pivotable on the inboard side of the occupant's seat).

SUMMARY OF THE INVENTION

In accordance with this invention, there is provided a vehicle passive seat belt system comprising:

a seat belt means adapted to be secured about an occupant of the vehicle when the occupant is seated in a seat adjacent a door of the vehicle, the seat belt means being movable between a first, occupant-restraining position and a second, non-occupant restraining position whereby the occupant is free to ingress to and egress from the vehicle;

retractor means mounted adjacent to one side of the seat, the seat belt means being connected to the retractor means;

a lever pivotable in a first direction for moving the seat belt means between its first and second positions, the lever being pivotably mounted adjacent the retractor means and including means for contacting the seat belt means and permitting the seat belt means to move therethrough; and covering means pivotable in a second direction opposite to the first direction, the covering means being located adjacent the retractor means and the lever, the covering means providing protection for the lever and the retractor means when the seat belt means is in its first position.

The passive seat belt system of this invention may include a separate retractor for lap and shoulder belts that are located adjacent the inboard side of the seat, with the opposite ends of the belts being connected to the vehicle door. Also, it is preferred that a single lever and single covering means be provided for both the driver's and passenger's seats.

The present invention provides a mechanism for protecting the pivotable lever and protecting the occupant from movement of the lever which is used to move the seat belts into and out of position.

DESCRIPTION OF THE PREFERRED EMBODIMENTS

Figure 1:
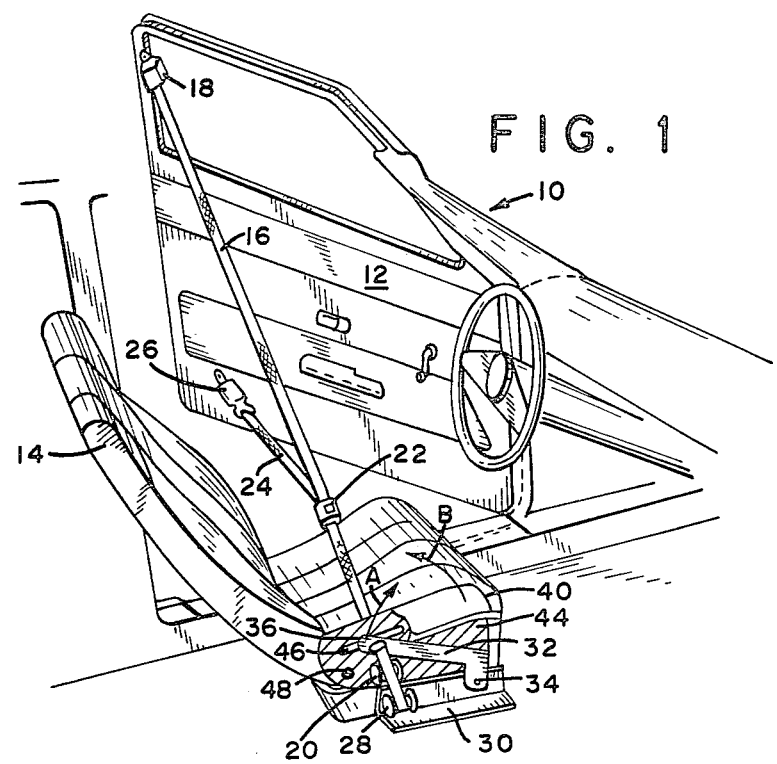
FIG. 1 is a view of the passive seat belt system of this invention, for a driver's seat, with sections cut away.

With reference to FIG. 1, there is shown a passive seat belt system, generally indicated at 10, in a vehicle which includes a door 12 and a seat 14 adjacent door 12. A torso belt 16 has one end mounted to door 12 through an anchor 18 and its other end connected to a retractor 20 located on the inboard side of seat 14. Torso belt 16 extends, through intermediate portion thereof, through a guide clip 22. Such a guide clip is shown in cofiled application of R. V. Thomas and R. L. Stephenson and entitled "Passive Seat Belt System with Guide Clip", Ser. No. 062,082. It is to be understood, however, that a guide clip is not required in the present invention. A separate lap belt 24 has one end mounted to door 12 through anchor 26 and its other end connected to a retractor 28 also located on the inboard side of seat 14. Retractor 20 and 28 are of the emergency locking type and may be housed in a single frame attached to the vehicle floor or console adjacent seat 14 inboard of door 12. Preferably, retractors 20 and 28 are mounted to the vehicle floor via a bracket 30. Preferably, anchors 18 and 26 are in the form of seat belt buckle and tongue assemblies which may be utilized for emergency release of the passive seat belt system. Alternatively, retractors 20 and 28 may be provided with a release mechanism to permit free spooling and thereby provide an emergency release from the system.

Mounted on an upright leg of mounting bracket 30 on the inboard side of seat 14 is a pivotable lever 32. Lever 32, which pivots on bar 34, is preferably in the form of a collapsing telescope device having several sections. At the distal end 36 of lever 32 is supported a ring 38 in the form of a D-ring through which belt 16 and 24 extend. Preferably, ring 38 is supported via a laterally extending bar 48 on the distal end of lever 32. Located on bar 38 is one or more rollers 50 that are rotatable on the bar and adapted to contact the under surface 60 of an arm rest 40. Lever 32 is connected by a cable mechanism 52 to a reversible motor M located adjacent seat 14 which may be actuated upon the occurrence of a predetermined event, such as by moving the gear selector in the vehicle into and out of the park position. Lever 32 is pivotable in a first direction (arrow A) which is clockwise as viewed in FIG. 1. As lever 32 pivots and telescopes, it moves belts 16 and 24 forwards to their non-restraining position as described below.

Also located on the inboard side of seat 14 is a pivotable arm rest 40 having an upper surface 42 and a side 44 provided with a cut-out section 46 through which belts 16 and 24 extend. Arm rest 40 is pivotable in a counterclockwise direction (arrow B) as viewed in FIG. 1, that is, in a direction opposite to the pivotable movement of lever 32 to move the belts to their non-restraining positions. Arm rest 40 is located between seat 14 and lever 32 and is rotatable upon rotation of lever 32 as explained below.

Figure 2:
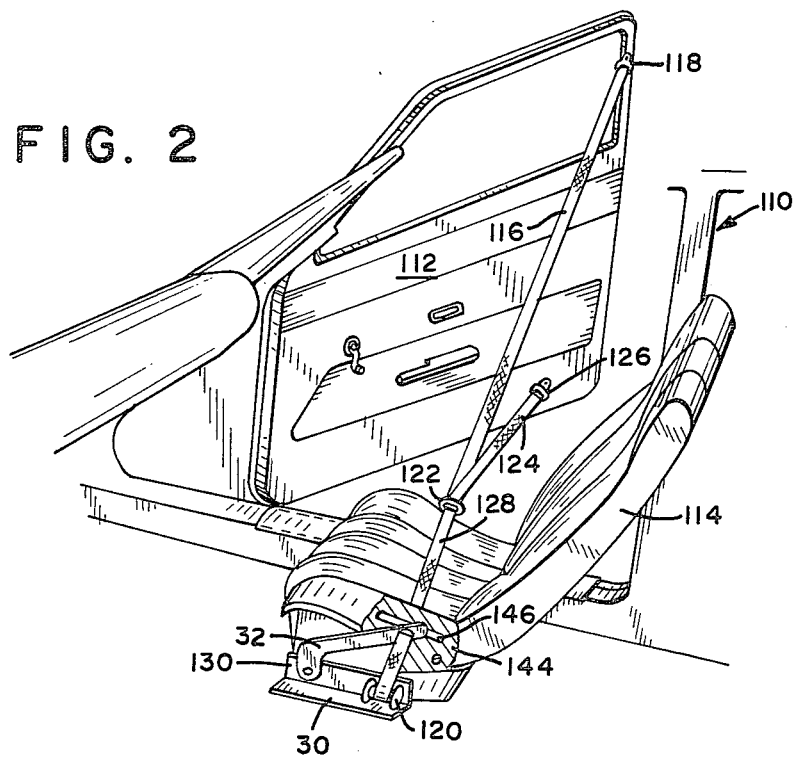
FIG. 2 is a view of the passive seat belt system of this invention, for a passenger's seat, with sections cut away.

It should be pointed out that a single seat belt may be utilized instead of separate lap and torso belts. Alternatively, a three point passive seat belt system may be employed using a single retractor, as shown in FIG. 2 for the passenger's side. It is also to be understood that the specific design of the lap and shoulder belts as shown herein in FIGS. 1 and 2 for the driver's and passenger's seats may of course be reversed or be the same for each seat.

Preferably, arm rest 40 is a common arm rest with passenger seat 114 as shown in FIG. 2. The passive seat belt system 110 shown in FIG. 2 is utilized with seat 114 adjacent to a door 112 of the vehicle. Torso belt 116 has one end mounted to door 112 through an anchor 118. Torso belt 116 is in the form of a continuous loop of webbing which extends through a ring 122 and back towards door 112 to anchor 126 mounted on door 112. There is thus formed a lap belt 124 for the occupant. Ring 122 is connected through an intermediate belt 128 to retractor 120 mounted on the inboard side of seat 114. Preferably, retractor 120, which is also of the emergency locking type, also is mounted to the vehicle via a mounting bracket 30. Ring 122, through which torso belt 116 and lap belt 124 normally freely extend, may be in the form of a locking junction ring.

Lever 32, which also may be common with seats 14 and 114, as shown, is pivotably mounted on leg 130 of bracket 30. At the distal end of lever 32, opposite to ring 38 associated with the seat belt system of seat 14, is a second ring 138 for the seat belt system 110. Ring 138 is supported by bar 148, which also supports one or more rollers 150 adapted to contact the underside of arm rest 40. Intermediate belt 128 extends through a cut-out portion 146 in side 144 of arm rest 40 and extends through ring 138 to retractor 120.

Figure 3:
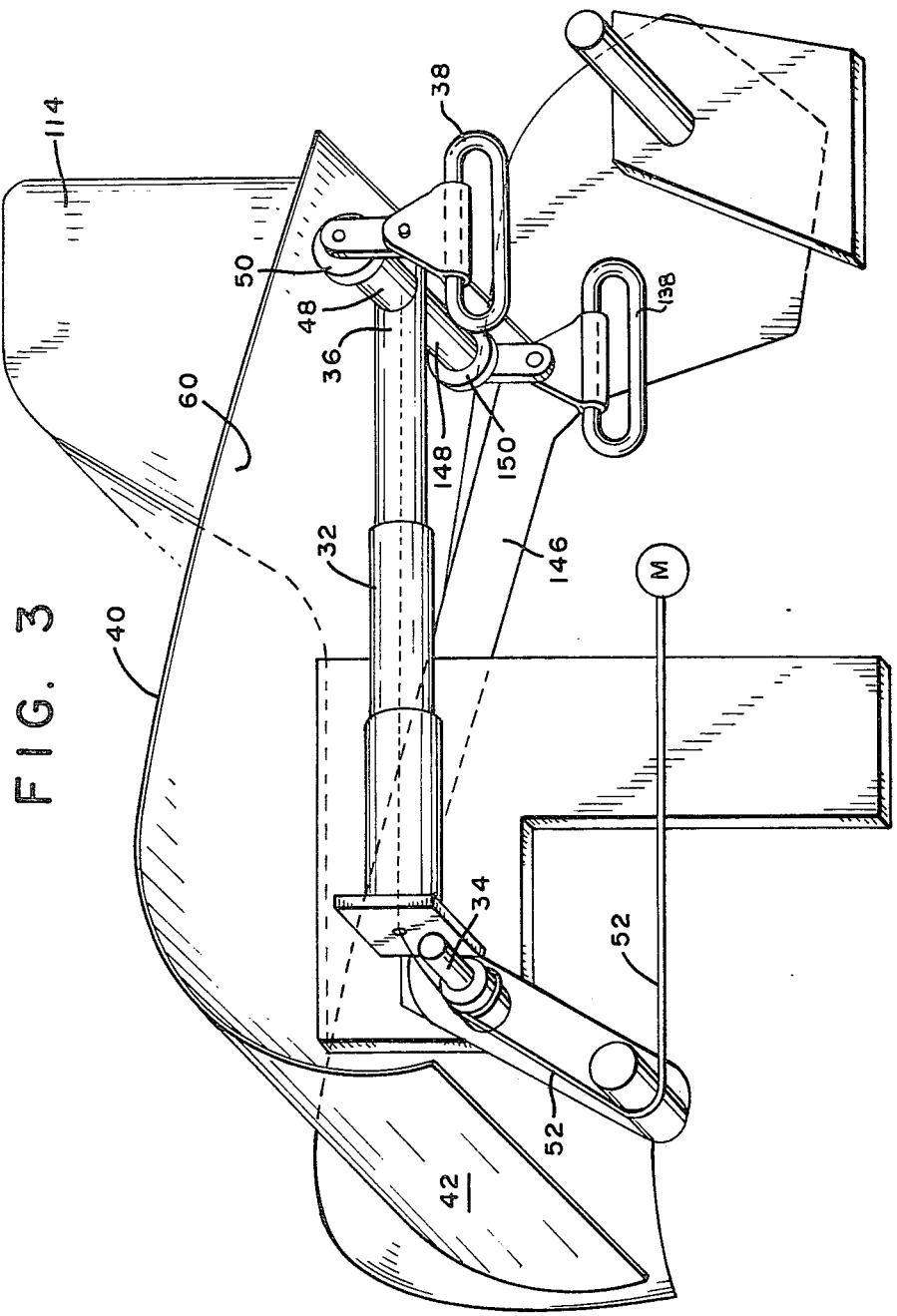
FIG. 3 is a detailed view of the lever and arm rest of this invention.

In operation, with the doors closed and the occupants positioned in their seats, in response to the actuation of the predetermined event, such as the movement of the gear selector into the park position, motor M associated with the passive seat belt system is actuated whereby cable mechanism 52 in turn is actuated. Lever 32, being initially in its fully extended position shown in FIG. 3, first telescopes inwards to its fully retracted position, drawing the seat belts 16 and 24 in FIG. 1, and intermediate belt 128 in FIG. 2, towards the front of the vehicle. Lever 32 is thereafter pivoted in a clockwise direction as viewed in FIG. 1 (counterclockwise as viewed in FIG. 2) so as to move the belts additionally forwards and upwards as viewed in FIGS. 1 and 2. At the same time, rollers 50 and 150 of bars 48 and 148 of lever 32 contact the under surface 60 of arms rest 40 and pivot the same in a rearward, counterclockwise direction as viewed in FIG. 1. This movement continues until such time as lever 32 has reached its limit of movement which preferably occurs when lever 32 is in a substantially vertical position. Arm rest 30 has at this point been rotated upwards and rearwards and may extend, for example, through an angle of rotation of about 30°. In such position, the torso and lap belts of FIG. 1 and the intermediate belt 128 of FIG. 2 are moved to a forward position such that additional room is provided for the occupants to egress from (as well as ingress to) the vehicle.

When doors 12 and 112 are closed, and the gear selector is moved out of the park position, motor M is again actuated whereby cable 52 moves lever 32 to pivot rearward in the vehicle in a counterclockwise direction as viewed in FIG. 1. The telescope sections of lever 32 are telescoped to their fully extended position when lever 32 is pivoted downwardly (such as by a spring within lever 32). Pivotal movement of lever 32 also causes arm rest 40, due to its weight, to pivot downwards in a clockwise, forward direction as viewed in FIG. 1 through contact by rollers 50 and 150. Such movement brings belts 16 and 24 in FIG. 1, as well as intermediate belt 128 together with belts 116 and 124 in FIG. 2, to their occupant-restraining positions. At such position, rings 38 and 138 are adjacent seats 14 and 114, respectively, within cutouts 36 and 136 of arm rest 40. Guide clip 22 and junction ring 122 are located between the mid point of the occupant and the outboard side of arm rest 40, depending on the relative size of the occupant, and preferably adjacent to the occupant's hip. Upon movement of the gear selector back into the park position, and, if preferred, also upon opening of doors 12 and 112, lever 32 once again is actuated and pivots forwardly to move the belts to their non-restraining positions.

It should be understood that arm rest 40 may be pivoted independent of the movement of lever 32 by use of a separate drive mechanism. Also, the drive mechanism for lever 32 and/or arm rest 40 may be a mechanical device as opposed to an electrical motor.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. A vehicle passive seat belt system comprising:
   a seat belt means adapted to be secured about an occupant of said vehicle when said occupant is seated in a seat adjacent a door of said vehicle, said seat belt means being movable between a first, occupant-restraining position and a second, non-occupant restraining position whereby said occupant is free to ingress to and egress from said vehicle;
   retractor means mounted adjacent to one side of said seat, said seat belt means being connected to said retractor means;
   lever means pivotable in a first direction for moving said seat belt means between its first and second positions, said lever being pivotably mounted adjacent said retractor means and including means for contacting said seat belt means and
   covering means pivotable in a second direction opposite to said first direction, said covering means being located above said retractor means and said lever, said covering means providing protection for said lever and said retractor means when said seat belt means is in its first position.

2. The passive seat belt system of claim 1 wherein said lever comprises telescoping sections.

3. The passive seat belt system of claim 2 wherein said lever means is pivotable in a forward direction in said vehicle whereby said seat belt means is moved to its second position, said covering means being pivotable in a rearward direction.

4. The passive seat belt system of claim 3 wherein said covering means includes a cut-out section through which said seat belt means extends and including an opening in said lever through which said seat belt means extends.

5. The passive seat belt system of claim 4 wherein said retractor means is mounted adjacent the inboard side of said seat.

6. The passive seat belt system of claim 5 wherein ring means are provided on one end of said lever means, said seat belt means extending through said ring means to said retractor means.

7. The passive seat belt system of claim 6 including means on said lever contacting said covering means such that said covering means is movable by movement of said lever means.

8. The passive seat belt system of claim 7 wherein said covering means comprises a pivotable arm rest located inboard of said seat and an adjacent seat, said covering means also having cut-out means adjacent to said other seat for permitting seat belt means associated with said other seat to pass therethrough.

9. The passive seat belt system of claim 8 wherein said lever means includes a second ring associated with said adjacent seat through which its seat belt means extends.

10. The passive seat belt system of claim 7 including separate torso and lap belts.

11. The passive seat belt system of claim 10 including separate retractors for said torso and lap belts, said retractors being mounted on the inboard side of said seat.

12. The passive seat belt system of claim 11 wherein opposite ends of said torso and lap belts are attached to said door.

13. The passive seat belt system of claim 7 wherein a single retractor is mounted adjacent said inboard side of said seat, and including an intermediate belt adapted to be wound up on said retractor, said intermediate belt being connected to a continuous belt forming torso and lap portions through a ring, said torso and lap portions being connected to said door.

14. The passive seat belt system of claim 7 wherein said means on said lever contacting said covering means comprises roller means affixed to one end of said lever.

15. The passive seat belt system of claim 3 including a motor operable to pivot said lever means.

16. The passive seat belt system of claim 15 including cable means connecting said motor and said lever means.

* * * * *